Feb. 2, 1932.　　S. MARJASON　　1,843,827
SLOT RELEASE MECHANISM
Filed May 24, 1930　　3 Sheets-Sheet 1

Feb. 2, 1932.   S. MARJASON   1,843,827
SLOT RELEASE MECHANISM
Filed May 24, 1930   3 Sheets-Sheet 2

Feb. 2, 1932.  S. MARJASON  1,843,827
SLOT RELEASE MECHANISM
Filed May 24, 1930   3 Sheets-Sheet 3

Patented Feb. 2, 1932

1,843,827

UNITED STATES PATENT OFFICE

SAM MARJASON, OF STEVENAGE, ENGLAND

SLOT RELEASE MECHANISM

Application filed May 24, 1930, Serial No. 455,340, and in Great Britain May 29, 1929.

This invention relates to a slot mechanism for use for example in connection with means for releasing goods from automatic delivery machines, and the principal object of the invention is to provide a slot mechanism of a form which is infinitely variable within practical limits so that goods of any price may be supplied by automatic delivery machines, the slot mechanism being operated preparatory to the release of the selected goods by a key or token of a form corresponding to the form of the particular slot mechanism, which key or token is obtained in exchange for cash. Thus no coin is employed with the slot mechanism and the risk of goods being obtained in exchange for spurious coins is avoided, and only the goods paid for can be released by the purchased key or token.

The improved slot release mechanism according to the present invention comprises a fixed member and a movable member each provided with a slot, said slots when in alignment with one another permitting the passage therethrough of a token for the purpose of effecting a further operation, means being also provided for retaining the movable member in a position with regard to the fixed member where the slots are out of alignment, until a token of appropriate form is inserted in the slot in the movable member.

The invention is illustrated by way of example in the accompanying drawings as applied to a delivery machine adapted to permit goods to be extracted after the insertion of a suitable token.

Figure 1:
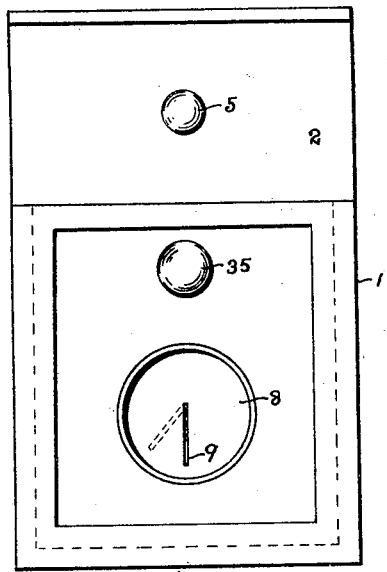
Fig. 1 is a view of the apparatus in front elevation.

Referring to the drawings, 1 represents the framework of the apparatus, 2 being a drawer to contain the goods to be delivered. The drawer is provided with guides 3 which slide in slots 4 in the framework, and with a knob 5 to permit the drawer when freed to be pulled forward preparatory to extraction of the goods. The locking and release mechanism is arranged within the framework and beneath the drawer 2. A supporting plate 6 of heavy metal is fixed in the front of the framework.

The plate 6 is provided with a circular aperture 7 and a concentric recess 12 in the front and in this recess is rotatably mounted a metal plate 8 in which is formed an elongated radial slot 9 which in the normal position is arranged vertically (Fig. 1). On the rear of the heavy metal plate 6 concentric with the aperture 7 therein is fixedly mounted the outer barrel of a lock 16 of the pin tumbler type, the inner barrel 11 of which is only rotatable within the outer when a key 10 of appropriate shape is inserted in the slot therein, and a number of radially arranged wards are moved into the releasing position.

The rotating barrel portion 11 of the lock is fixedly connected at the front end with the rotating plate 8, and the key slot in the inner barrel 11 and radially inner part of the slot 9 in the plate 8 are always in register with one another. Between the metal plate 8 and the bottom of the recess 12 is fixedly mounted an annular member 13 in the form of a metal ring, this ring being fixed to the plate 6 by screws 14 and an arcuate slot 15 may be provided in said ring to co-operate with a pin 21 on the rear of rotating plate 8 to limit the extent of movement of the latter as required.

The ring 13 and the outer barrel 16 of the lock are provided with radial slots 18 and 20 respectively in alignment with one another and in a position where they are aligned with slot 9 in plate 8 when the latter together with the inner barrel of the lock has been rotated as far as is permitted by pin 21 in slot 15.

The plate 13 is also provided on its inner periphery at a point diametrically opposite the slot 18 with a tongue 22.

Figure 2:
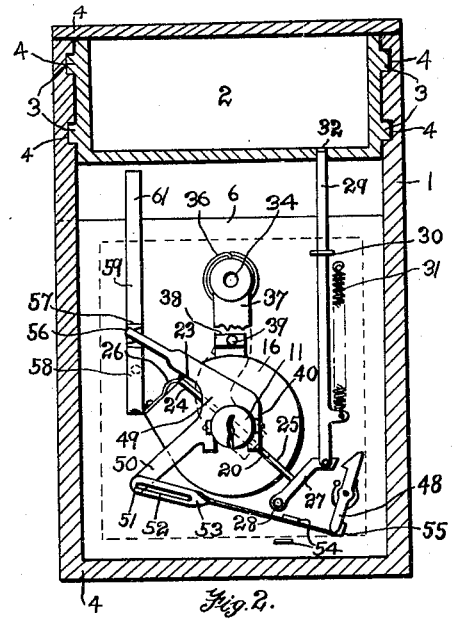
Fig. 2 is a part sectional rear elevation.

The outer barrel 16 of the lock is provided with a further radial slot 23 in diametrical alignment with the slot 20 and in these slots are mounted radially movable plates 24, 25 respectively. The plate 24 is arranged for movements outwards radially against return springs 26 fixed on the outside of the barrel. Plate 25 is held in the normal indrawn position by contact with a lever 27 pivoted at 28 on plate 6 (Fig. 2) and pivotally connected with a catch bar 29 guided in a lug 30 on plate 6 and normally urged upwards by a spring 31 so that its upper end engages in an aperture 32 in the bottom of the drawer 2 to retain the latter in the closed position.

Figure 5:
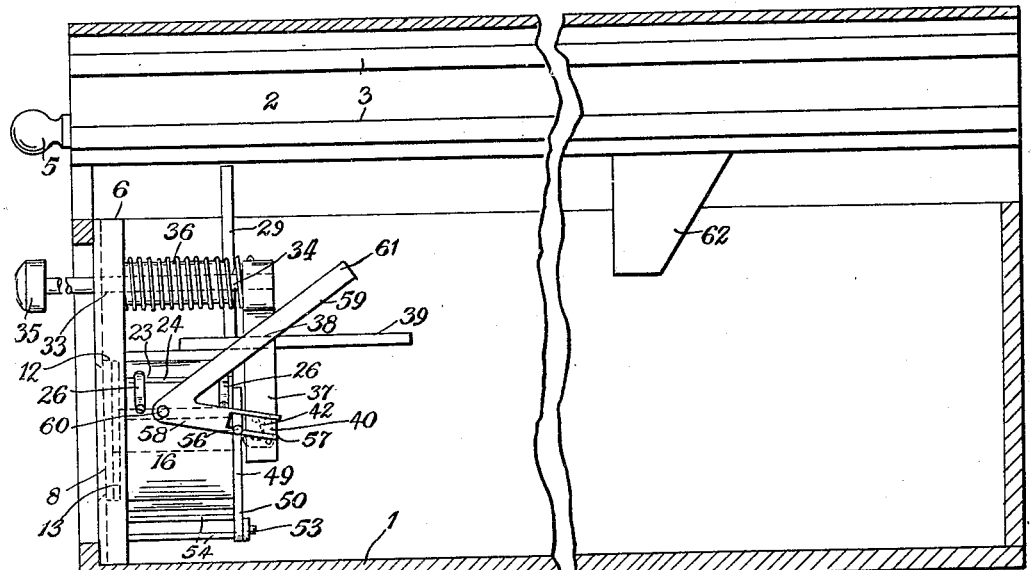
Figure 6:
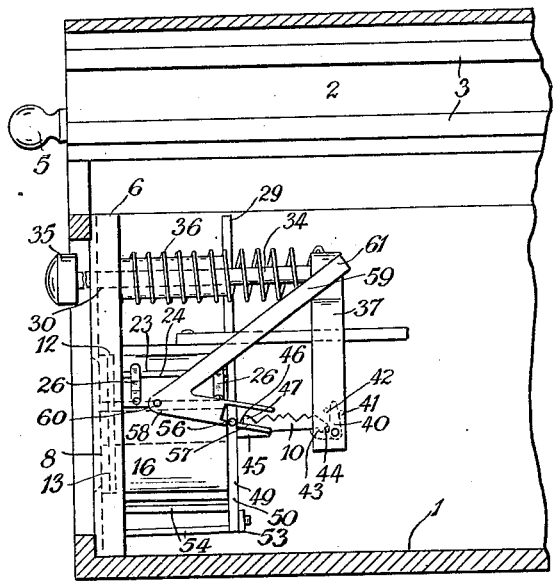
Figure 7:
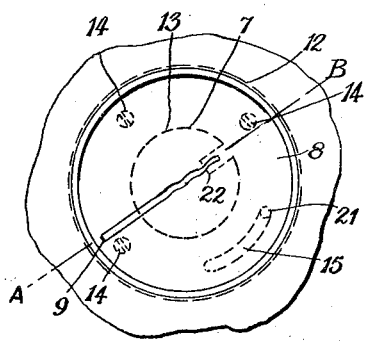
Fig. 7 is a detail and Fig. 8 is a sectional elevation on the line A—B of Fig. 7.

In an aperture 33 in plate 6 above the lock, a rod 34 is arranged for longitudinal sliding movement at the will of the operator through an external knob 35 and against a tension spring 36 connected between plate 6 and the inner end of rod 34. On the inner end of rod 34 is fixedly mounted a downwardly extending arm 37 provided with an aperture 38 which engages a fixed guide rod 39 during movements of the hand operated rod 34. At the lower end of arm 37 is carried a pivoted pawl 40 capable of limited movement between stops 41 on the arm 37 and normally urged in a clockwise direction in Fig. 5 by a light spring 42.

Figure 8:
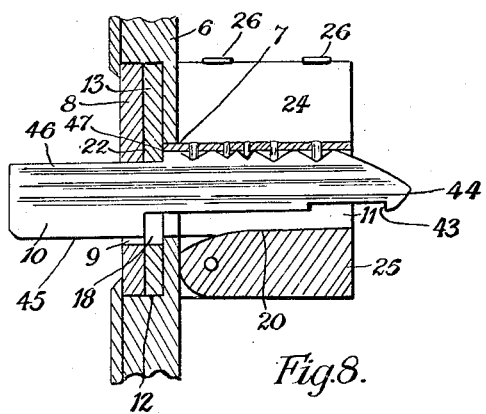

The token 10 comprises a key portion adapted to co-operate with the radial wards of the lock to release the inner barrel 11 and plate 8 for rotation; a recess 43 on its forward end forming a hook 44, an extension 45 at its lower rear edge and a stepped back part 46 on its upper rear edge to form a stop 47 (Fig. 8).

To release the drawer, the token is thrust into the slot 9 in plate 8 and the slot in the inner barrel 11 until projection 45 contacts with the outer surface of the annular member 13. If the correct token has been used the inner barrel 11 can now be rotated by means of the token 10 to an extent determined by the pin 21 in arcuate slot 15, and the elongated slots, 9 in plate 8, 18 in ring 13 and 20 in outer barrel 16 are brought into alignment with one another. In this position the stop 47 engages behind the tongue 22 on plate 13 and by this means removal of the key 10 with the inner barrel 11 in the rotated position is prevented. The token 10 is now thrust forward until the projection 45 has entered the aligned slots 9, 18 and 20 whereupon the hook 44 engages the pawl 40 on the arm 37. The knob 35 is now thrust inwards and the token 10 is thereby drawn through the aligned slots 9, 18 and 20 into the interior of the apparatus.

As the token moves through the slots 20 in barrel 16, plate 24 moves against the spring 26 to permit the movements of the radial wards of the lock necessitated by the passage of the key portion of the token, and the projection 45 engages the plate 25 in slot 20 to move it outwards radially. By this means the lever 27 is rocked about its pivot 28 into the position shown in Fig. 3 and the rod 29 is drawn downwards against the pull of spring 31 to withdraw the end of the rod 29 from the aperture 32 in the drawer 2, whereby the latter is freed for withdrawal, and the goods can thereupon be taken from its interior.

Figure 3:
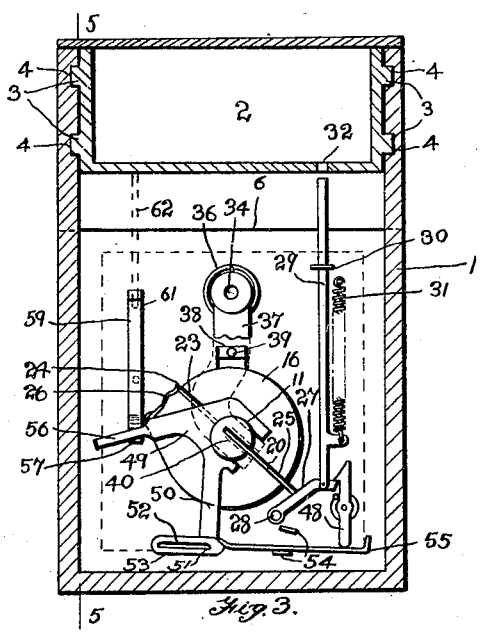
Fig. 3 is a view similar to Fig. 2 but with the parts in different positions.

To retain the rod 29 in its down drawn position, a spring pressed pivoted catch lever 48 is provided to snap over the end of lever 27 when the latter enters the position shown in Fig. 3. Means are provided to reset the mechanism to the normal position as the drawer is drawn out preparatory to extracting the goods.

On the inner end of the inner barrel 11 is fixedly mounted a bell crank lever 49, one arm 50 of which extends downwards and carries on its lower end a pin 51 adapted to engage in an elongated slot 52 in a bar 53 mounted for longitudinal movement between guiding lugs 54. The free end of the bar 53 is upturned to form a hook 55 for engagement with the lower end of catch lever 48 when bar 53 is moved to the left in Fig. 3 to rock said lever 48 in a clockwise direction. The other arm 56 of bell crank lever 49 engages in a fork 57 at the end of one arm 58 of another bell crank lever 59 itself mounted to move about a fixed pivot 60. The other arm 61 of the bell crank lever 59 extends into the path of a projection 62 provided on the underside of the drawer 2.

The parts having been moved as described above into the position shown in Fig. 5 to permit the drawer to be opened, said drawer is moved to the left in that figure.

Figure 4:
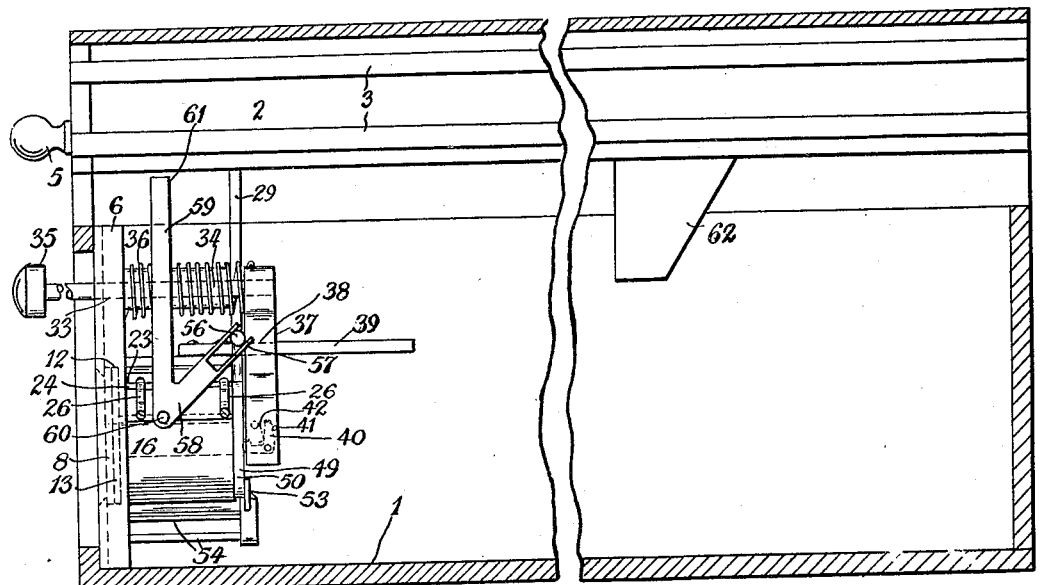
Figs. 4, 5 and 6 are part sectional side elevations showing the parts in various positions.

As the drawer approaches its full open position projection 62 engages arm 61 of lever 59 and returns it to the position indicated in Fig. 4. By this means bell crank lever 49 is rocked to return the barrel 11 to its locked position and at the same time bar 53 is drawn by pin 51 to the left in Fig. 3. The hook 55 engages and trips catch lever 48 and rod 29 moves upwards under the pull of spring 31 until its end contacts with the underside of drawer 2 so that when the latter is again closed, the rod 29 snaps into aperture 32 and the drawer is held against withdrawal until a token 10 is again passed through the release mechanism.

The slot mechanism may be mounted in position upon the machine in such a manner as to be readily interchangeable, so that a particular form or pattern of slot mechanism may be held to correspond with a fixed price, and a slot mechanism corresponding to the current price mounted in the required position on the machine.

Whilst the invention has been described above in connection with a delivery machine for the automatic delivery of goods, it is to be understood that it is equally well adapted for use for any other purpose where a token of particular form is identified, accepted and passed into the interior of the apparatus to perform a further operation.

I claim:

1. Token operated slot release mechanism comprising a slotted fixed member, a slotted movable member movable to permit the slots in the fixed and movable members to be brought into alignment with one another, retaining means adapted to hold the movable member in a position where the slots in the fixed and movable members are out of alignment, until a token of appropriate form is inserted in the slot in the movable member, means for moving the token through the aligned slots and means adapted to be operated by said token when moved through the aligned slots, to effect the desired release.

2. Token operated slot release mechanism comprising a radially slotted fixed outer barrel, a radially slotted cylinder adapted for rotation within the outer barrel, means adapted to hold the cylinder in a position with regard to the outer barrel where the radial slots are out of alignment with one another until a token of appropriate form is inserted in the slot in the cylinder, means for moving the token through the aligned slots and means adapted to be operated by said token when it is moved through the aligned slots, to effect the desired release.

3. Token operated slot release mechanism comprising a slotted fixed member, a slotted movable member movable to permit the slots in the fixed and movable members to be brought into alignment with one another, a key operated lock adopted to retain the movable member in a position where the slots are out of alignment, a token embodying a key adapted to release the lock to permit movement of the movable member, means for moving the token through the aligned slots and means adapted to be operated by the token when moved through the aligned slots to effect the desired release.

4. Token operated slot release mechanism comprising a slotted fixed member, a slotted movable member movable to permit the slots in the fixed and movable members to be brought into alignment with one another, a key operated lock adapted to retain the movable member in a position where the slots are out of alignment, a token embodying a key adapted to release the lock to permit movement of the movable member, a part on said token adapted to engage a fixed part of the mechanism until the slotted movable member has been moved to bring the slot therein into alignment with the slot in the fixed member, means for moving the token through the aligned slots and means adapted to be operated by the token when moved through the aligned slots to effect the desired release.

5. Token operated slot release mechanism comprising a slotted fixed member, a slotted movable member movable to permit the slots in the fixed and movable members to be brought into alignment with one another, a key operated lock adapted to retain the movable member in a position where the slots are out of alignment, a token embodying a key adapted to release the lock to permit movement of the movable member, a projection on said token, a fixed member within the release mechanism adapted to engage the projection on the token after the movable member has been released to prevent withdrawal of the token, means for moving the token through aligned slots and means adapted to be operated by the token when moved through the aligned slots to effect the desired release.

6. Token operated slot release mechanism comprising a slotted fixed member, a slotted movable member movable to permit the slots in the fixed and movable members to be brought into alignment with one another, retaining means adapted to hold the movable member in a position where the slots in the fixed and movable members are out of alignment, until a token of appropriate form is inserted in the slot in the movable member, means within the interior of the apparatus to engage the token after the latter has been thrust into the aligned slots in the fixed and movable members to draw said token completely through the slots and means adapted to be operated by said token when moved through the aligned slots, to effect the desired release.

7. Token operated slot release mechanism comprising a slotted fixed member, a slotted movable member movable to permit the slots in the fixed and movable members to be brought into alignment with one another, retaining means adapted to hold the movable member in a position where the slots in the fixed and movable members are out of alignment, until a token of appropriate form is inserted in the slot in the movable member, a hook on said token, a longitudinally movable device within the interior of the apparatus adapted to engage the hook on the token to draw said token completely through the slots and means adapted to be operated by said token when moved through the aligned slots, to effect the desired release.

8. Token operated slot release mechanism comprising a radially slotted fixed outer barrel, a radially slotted cylinder adapted for rotation within the fixed outer barrel, a key operated lock adapted to lock the cylinder with regard to the outer barrel, a token embodying a key adapted to release the lock to permit movement of the movable cylinder to bring the slots in the fixed and movable members into alignment with one another, a floating plate in the radial slot in the fixed outer barrel adapted to give freedom of movement to those parts of the lock co-operating with the key, means for moving the token through the aligned slots and means adapted to be operated by the token when moved through the aligned slots, to effect the desired release.

9. Token operated slot release mechanism comprising a slotted fixed member, a slotted movable member movable to permit the slots in the fixed and movable members to be brought into alignment with one another, retaining means adapted to hold the movable member in a position where the slots are out of alignment until a token of appropriate form is inserted in the slot in the movable member, a yielding member movable by the token when the slots in the fixed and movable members are aligned with one another, to permit passage of the token through the slots, means for moving the token through the aligned slots and means adapted to be operated by said token when moved through the aligned slots to effect the desired release.

In testimony whereof I have signed my name to this specification.

SAM MARJASON.